Patented Jan. 22, 1929.

1,699,961

UNITED STATES PATENT OFFICE.

JAMES WILL FINLAY, OF UNIVERSITY CITY, MISSOURI, ASSIGNOR TO PIERCE PETROLEUM CORPORATION, OF WILMINGTON, DELAWARE, A CORPORATION OF DELAWARE.

LUBRICATING COMPOSITION AND METHOD OF MAKING THE SAME.

No Drawing. Application filed April 13, 1927. Serial No. 183,616.

This invention relates to a composition of matter and the method of making the same, and with respect to its more specific features, to a lubricating grease and method for producing same.

By reason of its physical and chemical properties the composition is especially adapted for the lubrication of certain parts of motor vehicles, efficient lubrication of which has been very difficult with heretofore known lubricants. One of the objects is the production of a material peculiarly adapted to be used for lubricating the universal joints, differentials and chassis of all classes of motor vehicles, particularly busses and trucks operated in transportation service, where heavy duty is performed.

Another object of the invention is the production of a practical and efficient lubricating composition having great adhesive tendency, a high melting point and satisfactory lubricating qualities.

It is observed that the ordinary lubricating greases now offered on the market for this service are easily thrown off of the moving surfaces they are intended to lubricate, excessive heat is then generated by friction between these surfaces because of insufficient lubrication, resulting in unsatisfactory operation of the vehicle and necessitating frequent renewal of the lubricant. On the other hand, the grease I have invented, because of its adhesive property and high melting point, remain in place even at temperatures higher than normal. It has also been observed that the temperature rise when using my grease is much less than when ordinary greases are used, due to the superior lubrication obtained by my product.

My invention resides in the production of a lubricating compound by mixing various ingredients, such as sodium hydroxide, calcium hydroxide, cake tallow or other suitable animal fat, mineral oil and heavy tar in a suitable container and heating the mass, while stirring, to a sufficiently high temperature, which may be 300 degrees F. or more, to saponify the fat and melt and flux the calcium and sodium soaps thus formed with the mineral oil and tar, making a homogeneous mass which on cooling becomes the finished product.

The resulting grease is dark brown or nearly black in color, of soft, sticky consistency and high melting point, which may be in excess of 400 degrees F.

A typical batch consists of the following components by weight:

| | Per cent. |
|---|---|
| Animal fat | 16.5 |
| Caustic soda | 2.5 |
| Lime | 2.5 |
| Heavy tar | 5.0 |
| Mineral oil | 73.5 |
| Total | 100.0 |

Either hydrated lime or freshly slaked quick lime may be used. The heavy tar should have a viscosity of approximately 2000 seconds when measured by Saybolt universal viscosimeter at 210 degrees F., may be either the residue obtained from distillation of asphaltic or mixed base crude petroleum or the similar reduction of any hydrocarbon distillate. Asphaltum or asphaltic residues are also suitable. The mineral oil is a steam refined cylinder stock such as the residue obtained by distillation of paraffin base crude petroleum. The viscosity of this oil is preferably 150 seconds at 210 degrees F., as measured by the Saybolt universal viscosimeter, but may be as high as 200 seconds at 210 degrees F., without materially affecting the properties of the grease.

The function of each of the aforesaid ingredients is as follows:

The sodium soap formed by the chemical combination of caustic soda and the fat lends a fibrous structure to the grease and tends to increase the melting point. The calcium soap formed by the chemical reaction between the lime and the fat tends to shorten the fibers produced by the action of the soda soap and softens the consistency of the grease.

The heavy tar gives the grease adhesive properties and "tackiness".

The grease obtains its lubricating qualities principally from the mineral oil.

Having described my invention, what I claim as new and desire to secure by Letters Patent, is:

1. A grease lubricant consisting approximately of 73.5% by weight of mineral oil, 5% of heavy tar and small amounts of calcium and sodium animal soaps.

2. A grease lubricant composition made by mixing and heating to 300 degrees F. or more while stirring, approximately by weight: 73.5% mineral oil, 16.5% cake tallow, 2.5% freshly slaked quick lime, 2.5% caustic soda, 5.0% heavy petroleum tar.

3. A lubricating grease made by mixing and heating to a temperature of at least 300 degrees F., while stirring, approximately, by weight: 73.5% mineral oil, 16.5% animal fat, 2.5% lime, 2.5% caustic soda, 5.0% asphaltum.

In testimony whereof I affix my signature.

JAMES WILL FINLAY.